(12) United States Patent
Kuznar

(10) Patent No.: US 11,820,117 B1
(45) Date of Patent: Nov. 21, 2023

(54) TOOL FOR PATTERNING OVERLAYS

(71) Applicant: Vomela Specialty Company, St. Paul, MN (US)

(72) Inventor: Kevin Kuznar, Apple Valley, MN (US)

(73) Assignee: Vomela Specialty Company, St. Paul, MN (US)

( * ) Notice: Subject to any disclaimer, the term of this patent is extended or adjusted under 35 U.S.C. 154(b) by 64 days.

(21) Appl. No.: 17/172,162

(22) Filed: Feb. 10, 2021

Related U.S. Application Data

(60) Provisional application No. 62/972,352, filed on Feb. 10, 2020.

(51) Int. Cl.
| | |
|---|---|
| *B32B 38/00* | (2006.01) |
| *B26D 1/02* | (2006.01) |
| *B32B 37/12* | (2006.01) |
| *B32B 38/04* | (2006.01) |

(52) U.S. Cl.
CPC ............ *B32B 38/0004* (2013.01); *B26D 1/02* (2013.01); *B32B 37/12* (2013.01); *B32B 38/04* (2013.01); *B32B 2451/00* (2013.01)

(58) Field of Classification Search
CPC ................ B32B 38/0004; B32B 38/04; B32B 2038/042; B32B 37/12; B26D 1/02
See application file for complete search history.

(56) References Cited

U.S. PATENT DOCUMENTS

| | | |
|---|---|---|
| 5,491,902 A | 2/1996 | Uhrin et al. |
| 2002/0116835 A1 | 8/2002 | Mills |
| 2007/0287621 A1 | 12/2007 | Letherer |
| 2011/0197456 A1* | 8/2011 | Edwards ................ B26B 5/005 30/294 |
| 2012/0286446 A1 | 11/2012 | Miller et al. |
| 2017/0265567 A1* | 9/2017 | Kilgore .............. A43B 23/0245 |

(Continued)

FOREIGN PATENT DOCUMENTS

| | | | |
|---|---|---|---|
| EP | 2444212 | 4/2012 | |
| EP | 3248524 A1 * | 11/2017 | ............. A47K 13/00 |
| JP | H01192534 | 8/1989 | |

(Continued)

OTHER PUBLICATIONS

Owosso Graphic Arts, Inc., "Die cutting (web)", Web pages <https://en.wikipedia.org/wiki/Die_cutting-(web)>, 3 pages, retrieved Jan. 22, 2020.

(Continued)

*Primary Examiner* — Sonya M Sengupta
(74) *Attorney, Agent, or Firm* — Billion & Armitage

(57) ABSTRACT

A tool for patterning an overlay for placement about a projection structure extending from a mount surface may be temporarily positioned for patterning the overlay in situ. The tool may be configured for engagement with the projection structure, and include a cutting edge that is arranged into a pattern emulating a perimeter of the projection structure. Application of the overlay against the cutting edge of the tool cuts a relief portion from the overlay in situ to obtain an opening having a boundary that is shaped to closely accommodate the projection structure perimeter. The tool is then removed and the overlay applied against the mount surface in surrounding relationship to the projection structure extending from the mount surface.

5 Claims, 13 Drawing Sheets

(56) References Cited

U.S. PATENT DOCUMENTS

2018/0356176 A1    12/2018    Rose, III et al.

FOREIGN PATENT DOCUMENTS

| | | |
|---|---|---|
| JP | H11244970 | 9/1999 |
| JP | 2002358020 | 12/2002 |
| JP | 3679510 | 8/2005 |
| JP | 2010253952 | 11/2010 |
| KR | 100758268 | 9/2007 |
| KR | 20150093477 | 8/2015 |
| WO | 2019082033 | 5/2019 |

OTHER PUBLICATIONS

Owosso Graphic Arts, Inc., "Thermal Kiss-Cutting", Web pages, <https://www.owosso.com/products/magnesium-dies/thermal-kis-cutting/, 4 pages, retrieved Jan. 3, 2020.

\* cited by examiner

TOOL FOR PATTERNING OVERLAYS

CROSS-REFERENCE TO RELATED APPLICATIONS

This application claims priority to U.S. Provisional Patent Application Ser. No. 62/972,352, filed on Feb. 10, 2020 and entitled "Tool for Patterning Overlays," the content of which being incorporated herein in its entirety.

FIELD OF THE INVENTION

The present invention relates to die cutting tools generally, and more particularly to a specialized tool for patterning an overlay in situ to accommodate projection structures extending from a surface against which the overlay is to be applied.

BACKGROUND OF THE INVENTION

Die cutting is the general process of using a die to shear webs of material such as rubber, foil, cloth, paper, plastic, and sheet metal. Die cutting can be done on either flat bed or rotary presses, in which a shaped die is employed to cut into or through a web material to remove a specifically-shaped portion from the web material. Example modes for die cutting include thermal die cutting wherein the die is heated to a temperature that softens or partially melts the web material on contact, thereby facilitating the "cutting" or removal of the portion from the web material. Other die cutting applications employ physical pressure to press a cutting edge at least partially through the web material.

Overlays are surface coverings that may be functional, decorative, or both. Although overlays are employed in a wide variety of applications, a specific example is automotive body overlays that are applied to an exterior surface of an automotive body, such as a body panel, hood panel, roof panel, or the like. Such overlays may be transparent as a protective layer to the body's surface or may include printed graphics to add a decorative aspect to the overlay.

The overlay support surface, such as in the case of an automotive body panel, may be interrupted in its continuity by projection structures extending outwardly therefrom. In the case of automotive applications, example projection structures include hood emblems, antennae, door handles, key receptacle units, three-dimensional indicia, and the like. In order to affix an overlay to the surface, portions of the overlay consistent with the shape of the projection structure must be removed so that the overlay may be placed against the surface in a surrounding relationship to the projection structure. A challenge in creating the opening in the overlay to accommodate the projection structure therethrough is creating an accurate border that precisely adjoins the perimeter of the projection structure when the overlay is applied to the surface. This is especially true of complex projection structure designs. If the cutout is not precisely shaped, the overlay may need to be scrapped. Additionally, efforts at creating the opening with a precise boundary under conventional means can be very time-consuming.

It is therefore an object of the present invention to provide a tool to create precise openings in overlays in a time-efficient manner.

It is another object of the present invention to provide a tool for creating precise openings in overlays in a reproducible manner.

SUMMARY OF THE INVENTION

By means of the present invention, openings in overlays may be quickly and precisely created, so that the overlay may be placed against a surface neatly about a perimeter of a projection structure. In some embodiments, the present invention includes a tool for patterning an overlay for placement about a projection structure extending from a mount surface and defining a structure perimeter at the mount surface. The tool may include a receptacle defined by a base and a wall extending from the base in a first direction and arranged for frictional engagement with the projection structure. The tool further includes a cutting edge extending from the base in a second direction substantially opposed to the first direction, wherein the cutting edge is formed into a pattern emulating the structure perimeter.

The wall of the tool may be discontinuous and arranged into the pattern. The tool receptacle may be configured so that the projection structure is receivable within the receptacle.

A method for fitting an overlay to a surface having a projection structure extending from the surface includes engaging a tool about at least a portion of the projection structure adjacent to the surface. The tool preferable includes a receptacle defined by a base and a wall extending from the base in a first direction and arranged for engagement with the projection structure. The tool may further include a cutting edge extending from the base in a second direction substantially opposed to the first direction, wherein the cutting edge is formed into a pattern emulating the structure perimeter. The method further includes applying the overlay against the cutting edge of the tool to cut a relief portion from the overlay to obtain an opening in the overlay having a boundary defined by the pattern. The tool may then be disengaged from the projection structure so that the overlay may be applied to the surface with the opening at least partially surrounding the projection structure.

In some embodiments, the projection structure may be frictionally engaged within the receptacle.

DETAILED DESCRIPTION OF THE PREFERRED EMBODIMENTS

The objects and advantages enumerated above together with other objects, features, and advantages represented by the present invention will now be presented in terms of detailed embodiments described with reference to the attached drawing figures which are intended to be representative of various possible configurations of the invention. Other embodiments and aspects of the invention are recognized as being within the grasp of those having ordinary skill in the art.

Figure 1:
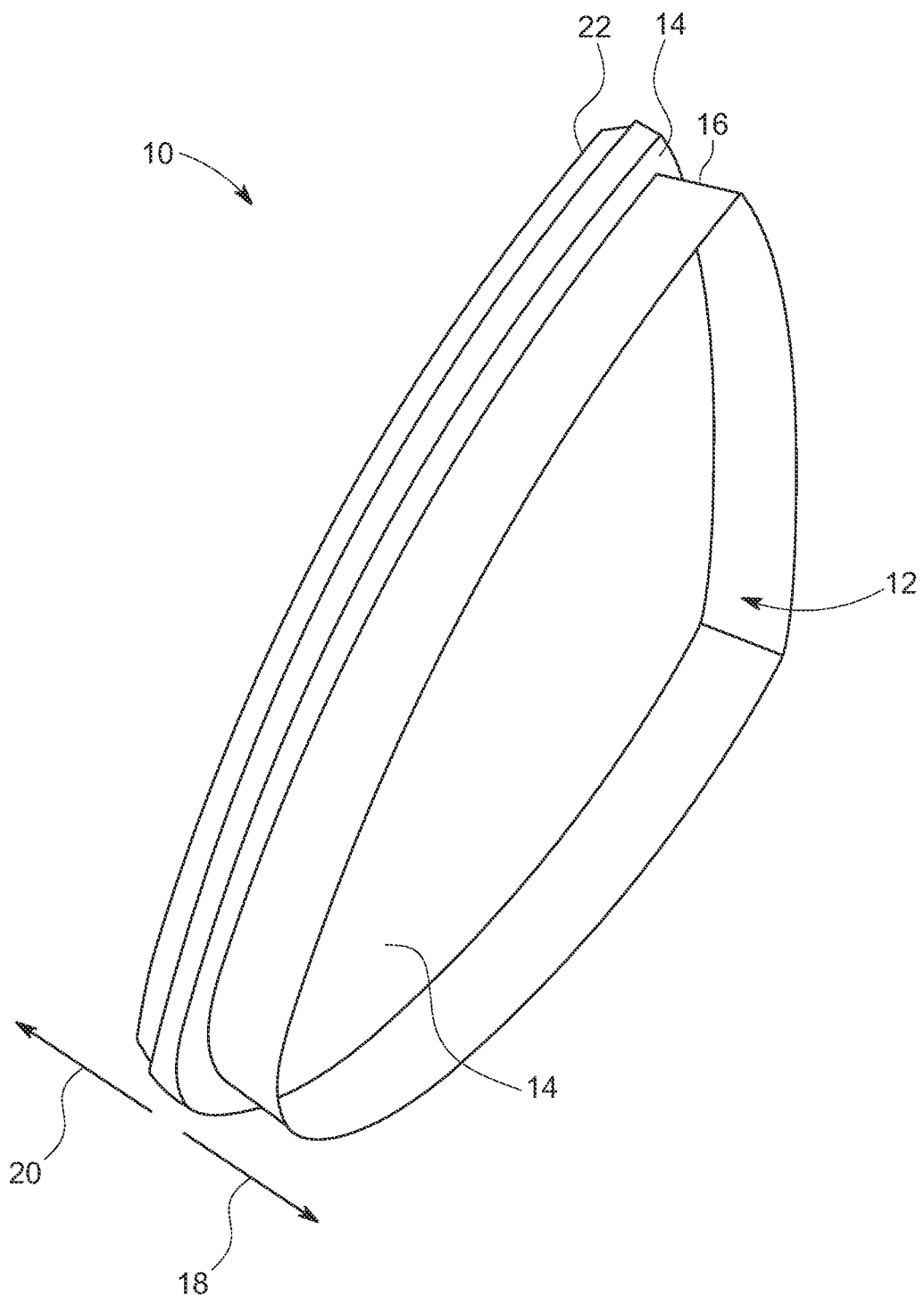
FIG. 1 is a perspective view of a pattering tool of the present invention.

With reference to the drawing figures, and first to FIG. 1, a tool 10 of the present invention includes a receptacle 12 defined by a base 14 and a wall 16 extending from base 14 in a first direction 18. In the embodiment illustrated in FIG. 1, wall 16 is continuous to form a perimeter enclosure about receptacle 12. It is contemplated, however, that wall 16 may instead be discontinuous. A primary purpose of wall 16 may be to provide engagement with a projection structure, as described in greater detail herein below. Thus, wall 16 may assume a variety of configurations that suit respective applications.

Figure 2:
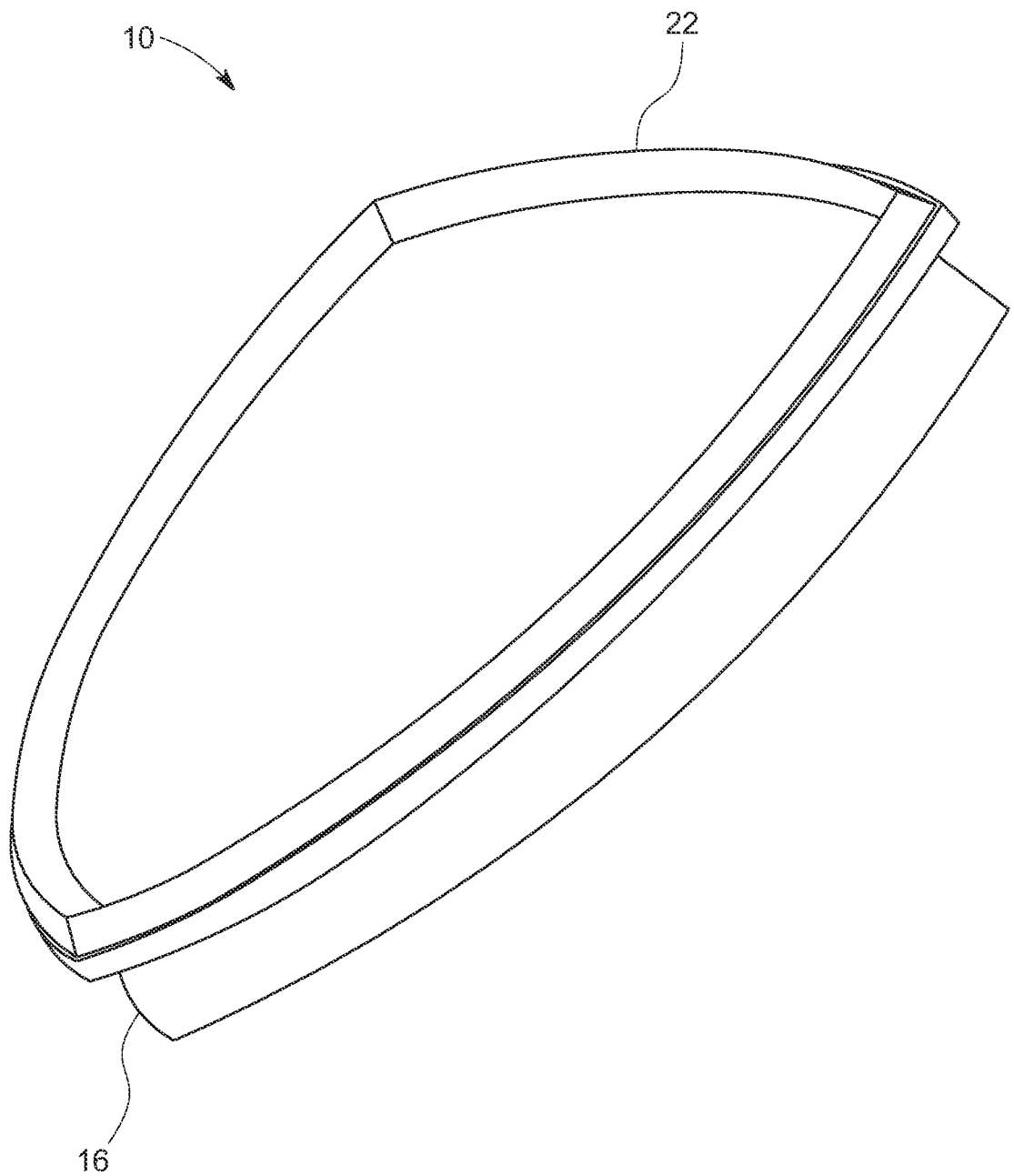
FIG. 2 is a perspective view of a patterning tool of the present invention.
Figure 3:
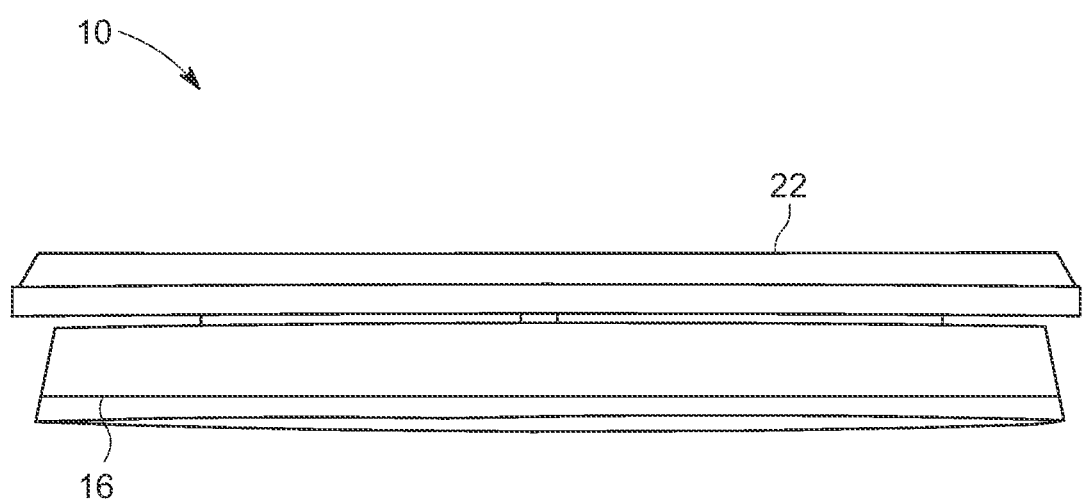
FIG. 3 is an elevational view of a patterning tool of the present invention.

Tool 10 preferably further includes a cutting edge 22 extending from base 14 in a second direction 20 that is substantially opposed to first direction 18. FIGS. 2 and 3 further illustrate the basic elements of tool 10.

Figure 4:
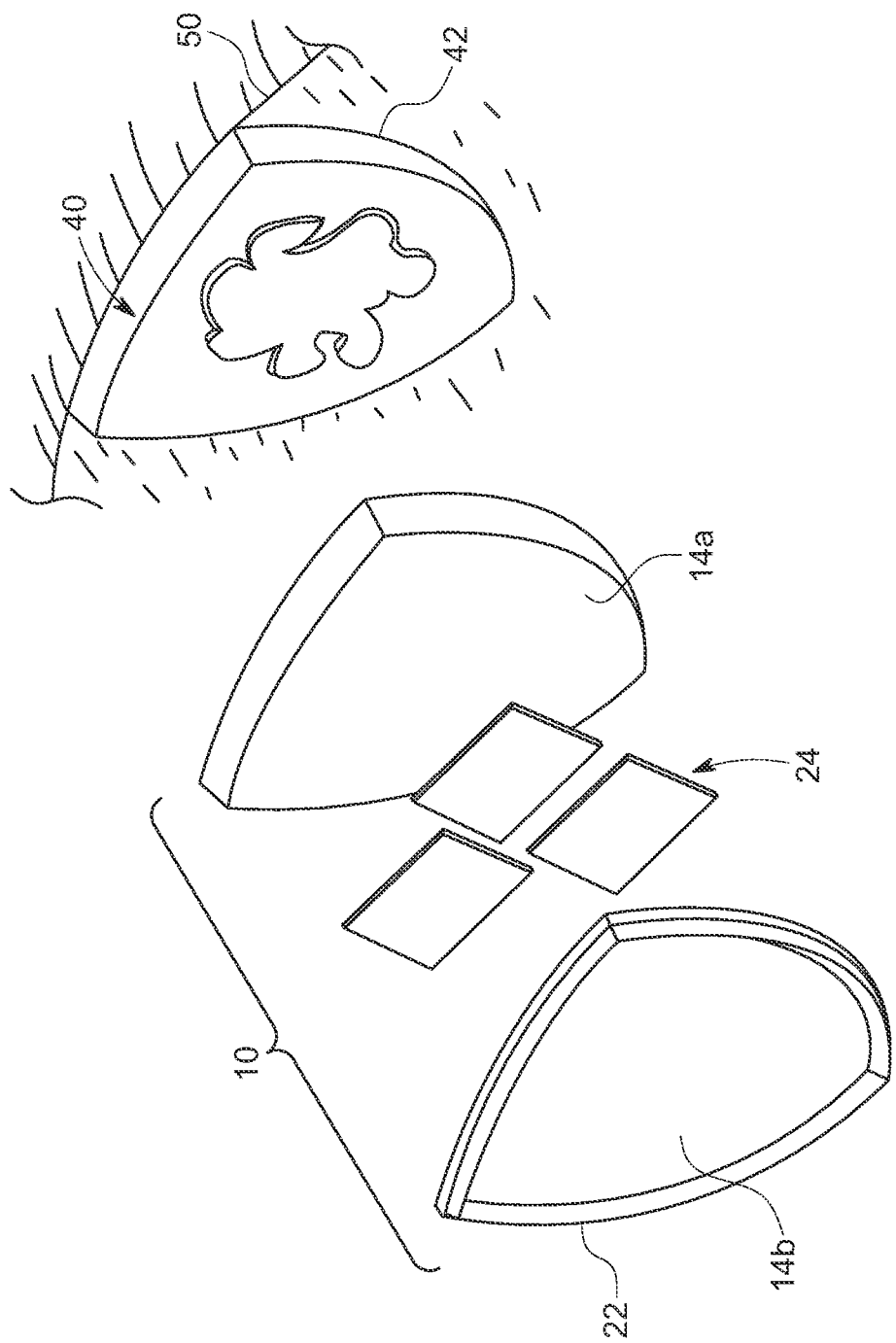
FIG. 4 is an exploded perspective view of a patterning tool of the present invention in coordination with a projection structure extending from a mount surface.

FIG. 4 is an exploded schematic illustration of tool 10 with relation to a projection structure 40 extending from a mount surface 50. In this embodiment, tool 10 includes a base 14 having a first portion 14a and a second portion 14b that may be secured to one another with a securement means, such as adhesive 24. Other means for securing first base portion 14a with second base portion 14b may include welding, fasteners, and other known mechanisms. First base portion 14a may, in some embodiments, be integrally formed with wall 16. For example, first base portion 14a and wall 16 may be molded or otherwise formed as a unitary body. Example materials for first base portion 14a and wall 16 include plastic, metal, metal alloys, ceramics, and the like. The second base portion 14b may, in some embodiments, be integrally formed with cutting edge 22 to form a unitary body. The combination of second base portion 14b and cutting edge 22 may comprise a cutting die manufactured from metal or other durable material.

Wall 16 is preferably configured to engage with projection structure 40. Such engagement may be sufficient to removably retain tool 10 at projection structure 40. In some embodiments, receptacle 12 may be configured to engageably receive projection structure 40 therein, such as through frictional engagement.

Figure 5:
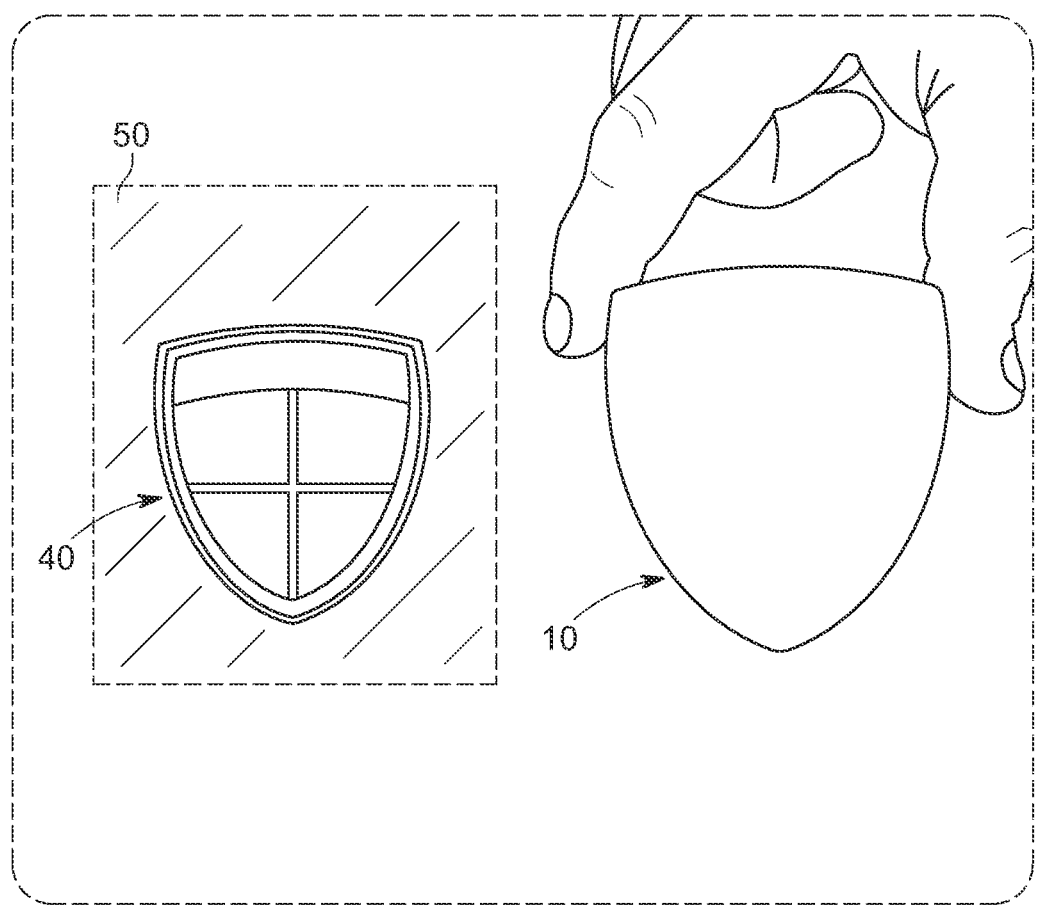
FIGS. 5-13 schematically illustrate application of a patterning tool of the present invention in coordination with a projection structure extending from a mount surface, along with an overlay cut in situ for replacement about the projection structure at the mount surface.
Figure 6:
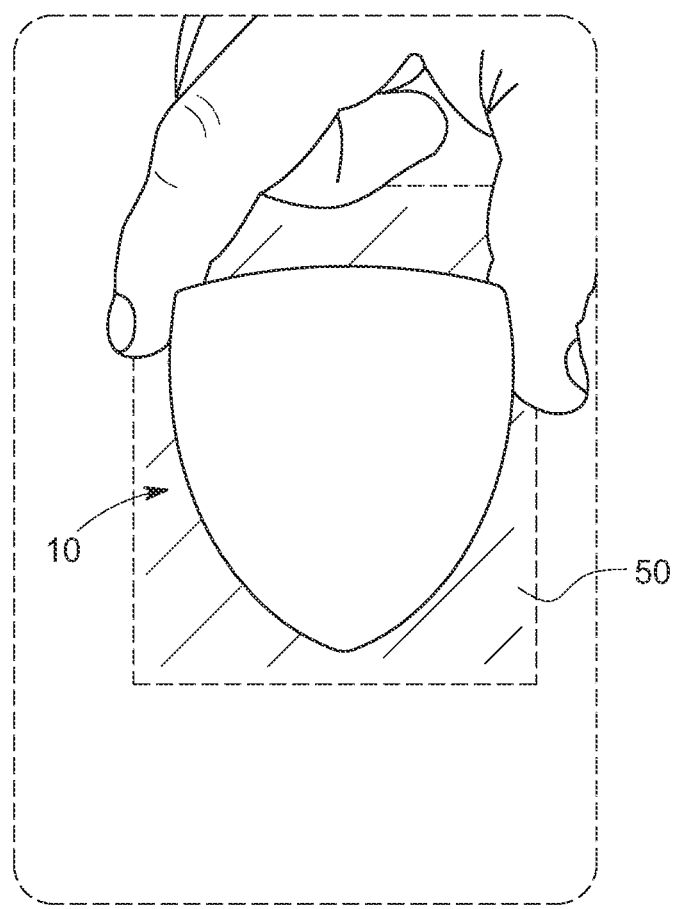

Projection structure 40 extends from mount surface 50 and defines a structure perimeter 42 where projection structure 40 intersects with mount surface. In some embodiments, structure perimeter 42 may be defined at other locations of projection structure 40 to meet specific design criteria of certain applications. In many embodiments, however, structure perimeter 42 at the intersection of projection structure 40 and mount surface 50 establishes a boundary about which an overlay may be neatly fitted adjacent to projection structure 40 when secured to mount surface 50. FIGS. 5 and 6 illustrate the engagement of tool 10 about at least a portion of projection structure 40 adjacent to surface 50. In some embodiments, tool 40 is positioned at projection structure 40 so as to frictionally engage projection structure 40 within receptacle 12.

Figure 7:
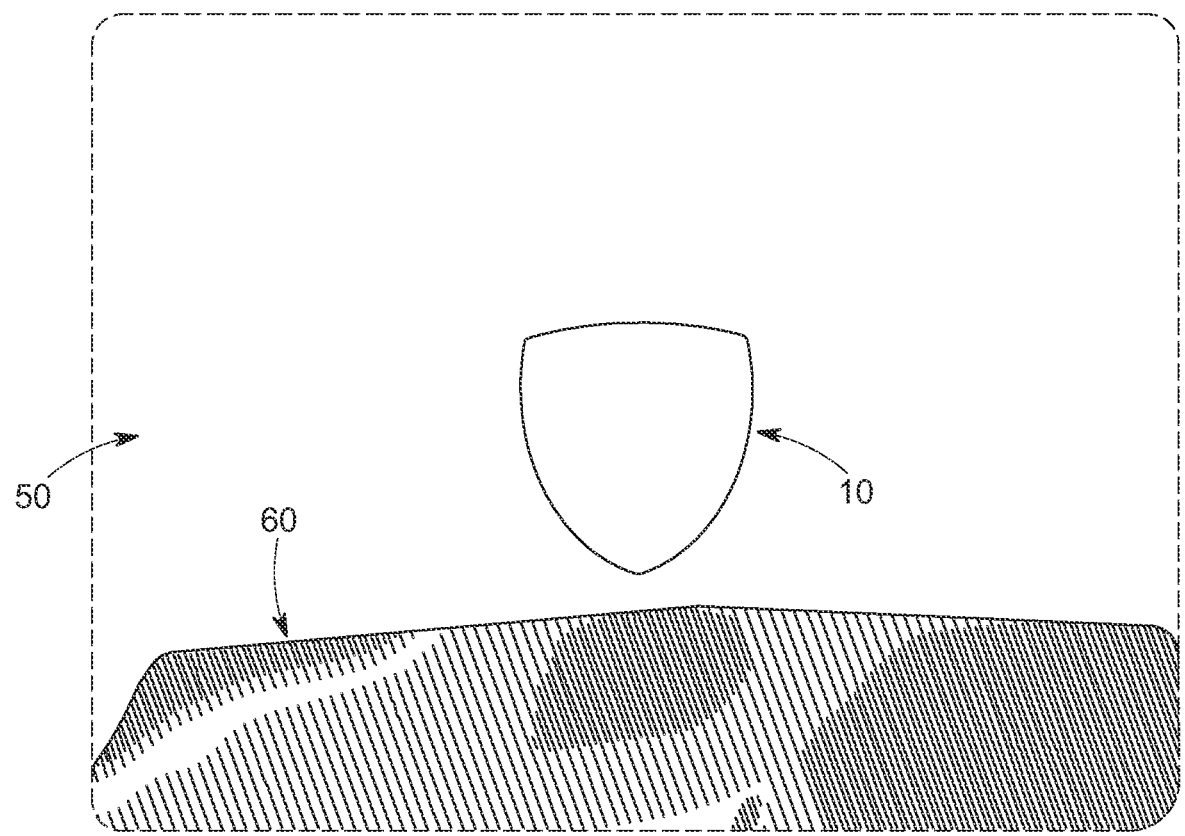
Figure 8:
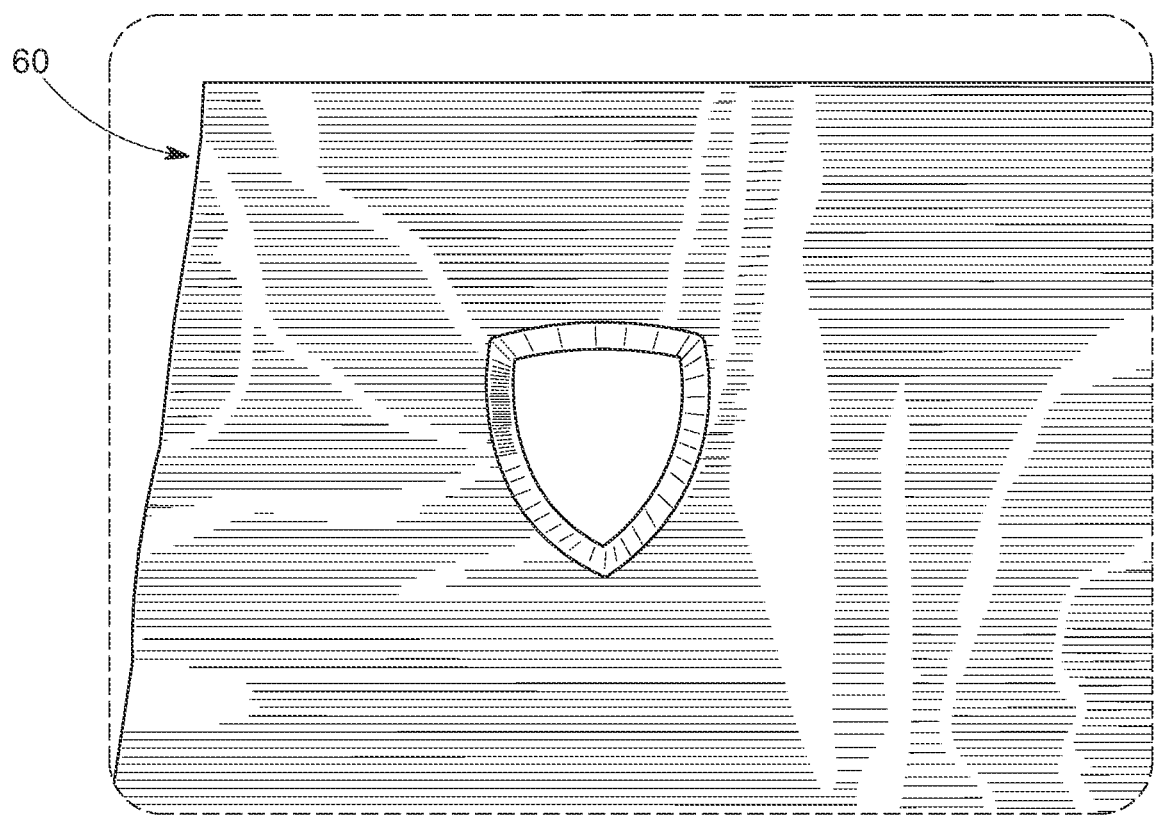
Figure 9:
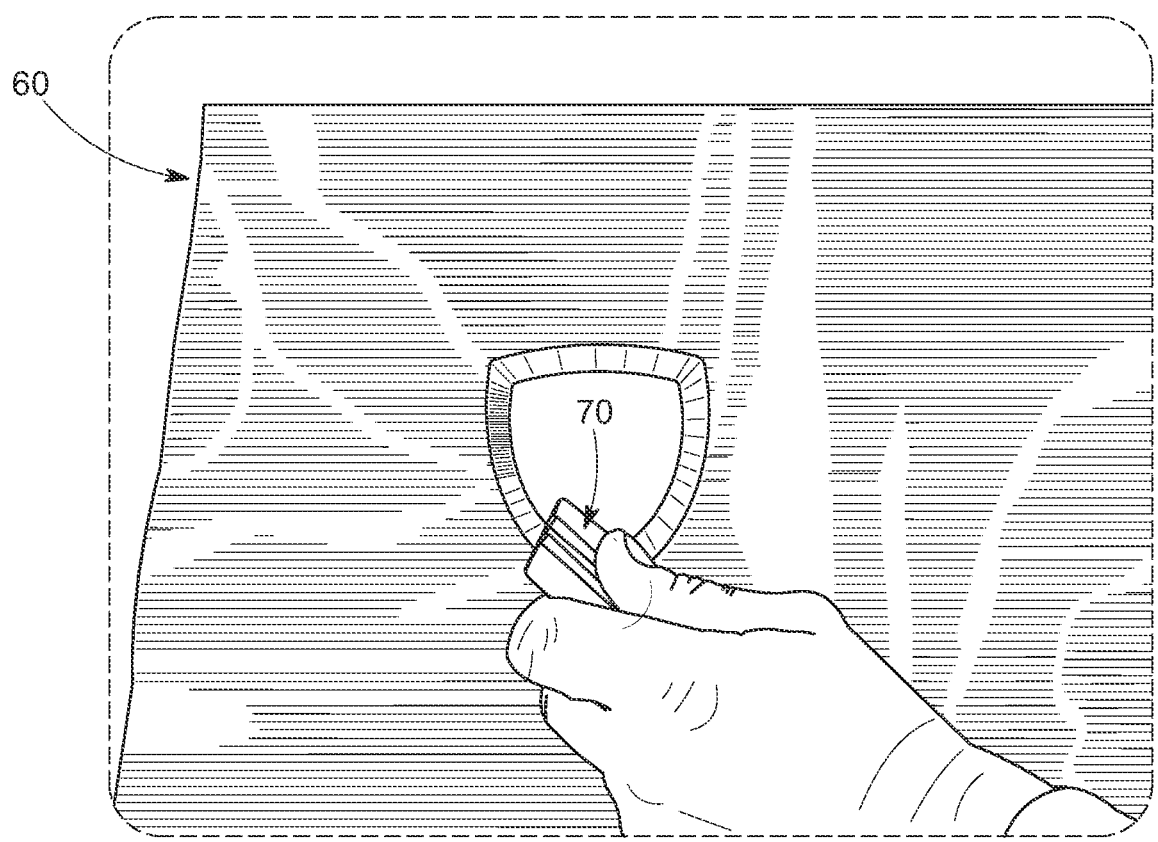
Figure 10:
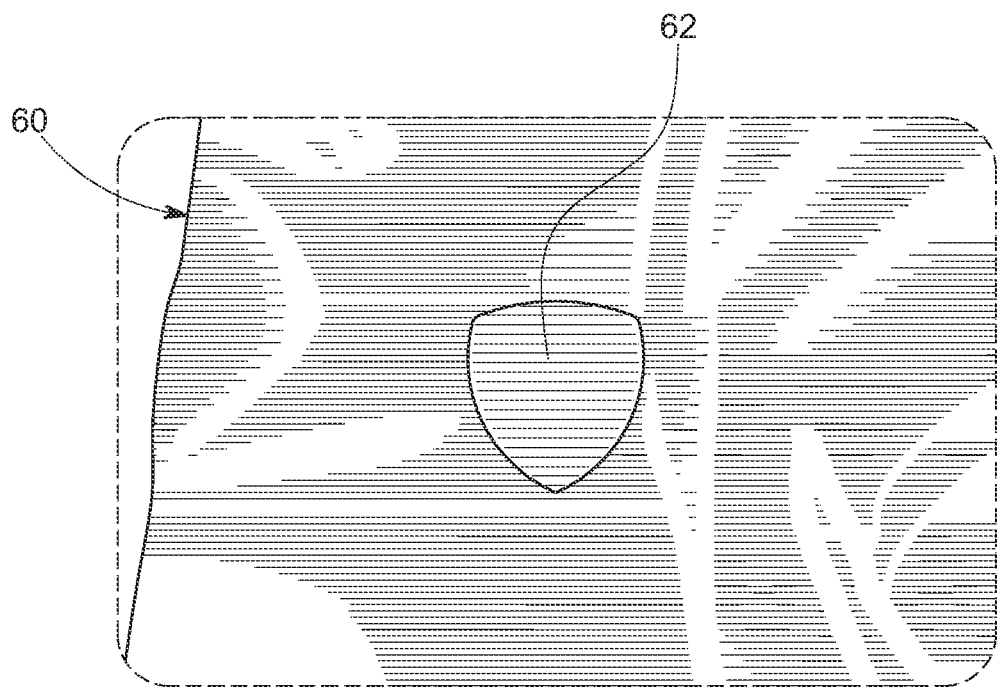
Figure 11:
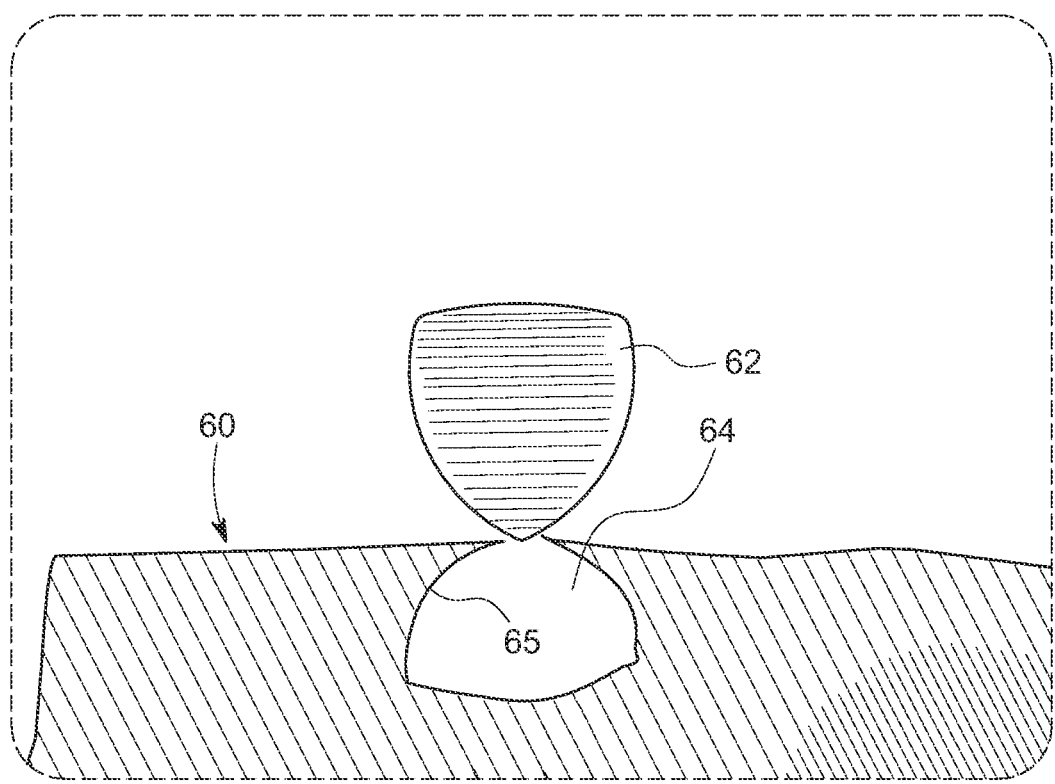
Figure 12:
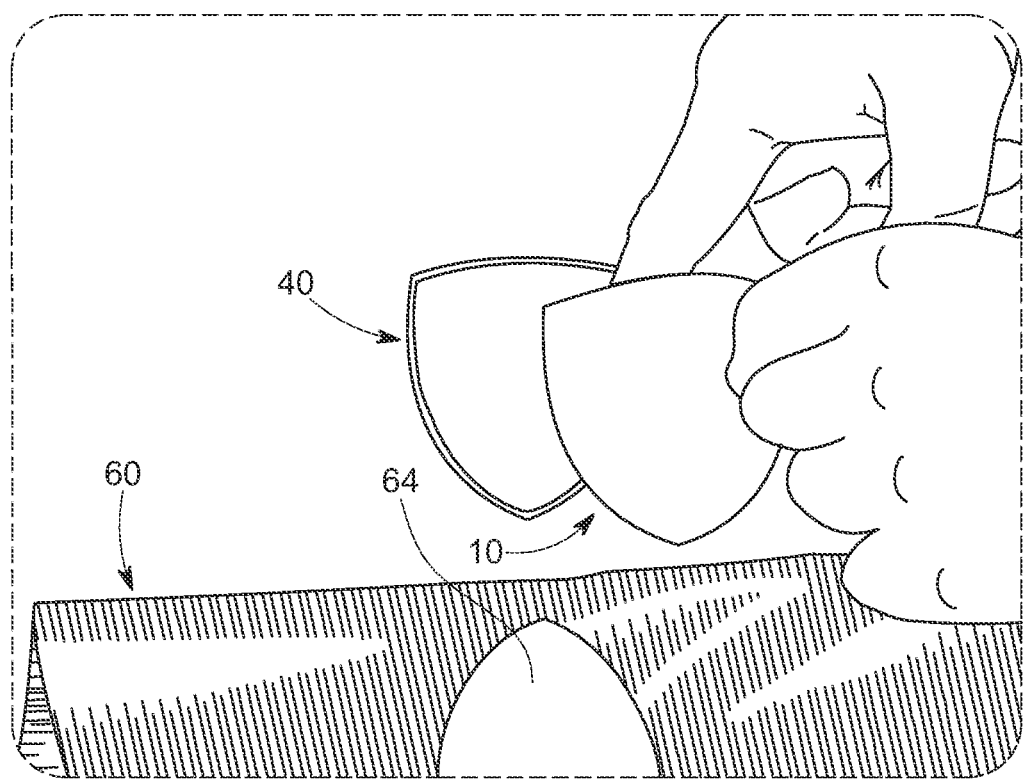

FIG. 7 illustrates an example embodiment in which an overlay 60 may be adhesively secured to surface 50 prior to applying overlay 60 against cutting edge 22 of tool 10. FIG. 8 illustrates overlay 60 applied against cutting edge 22 of tool 10. In some embodiments, as illustrated in FIG. 9, overlay 60 may be pressed down against tool 10 in order to force cutting edge 22 through overlay 60. The pressing down of overlay 60 against tool 10 may be accomplished with, for example, a pressing tool 70. The process of applying the overlay 60 against cutting edge 22 cuts a relief portion 62 from overlay 60, as illustrated in FIG. 10. The relief portion 62 may be removed from overlay 60 to obtain an opening 64 in overlay 60 having a boundary 65. The boundary 65 is configured in the pattern defined by cutting edge 22. In preferred embodiments, cutting edge 22 is formed into a pattern that emulates the structure perimeter 42. For the purposes hereof, the term "emulates" means to imitate or equal the structure perimeter at a cross-section of the projection structure. An example cross-section of the projection structure may be defined at the intersection of the projection structure with the mount surface. The cross-section need not be planar, but can be in some embodiments. In this manner, opening 64 has a boundary 65 that is defined by the pattern, which emulates structure perimeter 42 so that overlay 60 may be applied to surface 50 with opening 64 at least partially surrounding projection structure 40.

Figure 13:
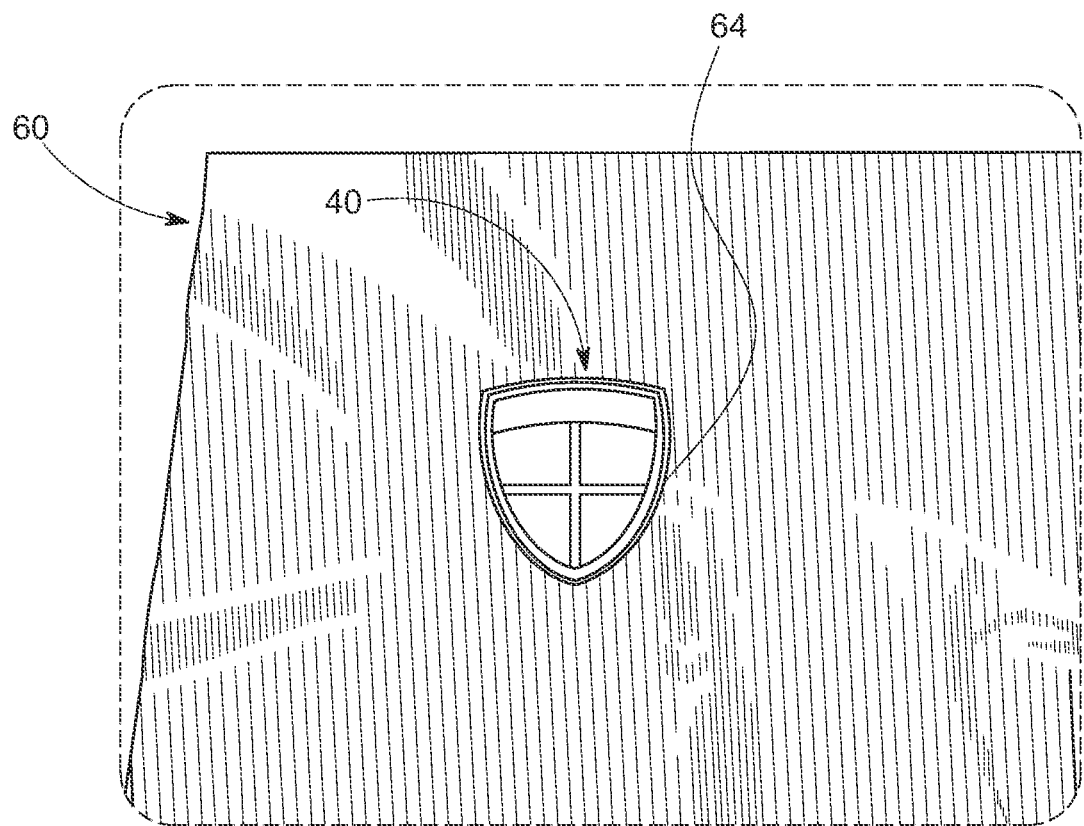

The overlay 60 may be peeled back from the assembly of tool 10 engaged with projection structure 40, so that tool 10 may be removed from engagement with projection structure 40. Overlay 60 may then be applied to surface 50 with opening 64 positioned about projection structure 40, as illustrated in FIG. 13.

The invention has been described herein in considerable detail in order to apply to the patent statutes, and to provide those skilled in the art with the information needed to apply the novel principles and to construct and use embodiments of the invention as required. However, it is to be understood that various modifications can be accomplished without departing from the scope of the invention itself.

The invention claimed is:

1. A method for fitting an overlay to a surface having a projection structure extending from the surface, the method comprising:
   (a) providing a tool for patterning the overlay for placement about the projection structure, the tool including:
      (i) a receptacle defined by a base and a wall extending from the base in a first direction and arranged for a frictional engagement with the projection structure; and
      (ii) a cutting edge extending from the base in a second direction substantially opposed to the first direction, the cutting edge formed into a pattern emulating a structure perimeter;
   (b) engaging the tool about at least a portion of the projection structure adjacent to the surface;
   (c) applying the overlay against the cutting edge of the tool to cut a relief portion from the overlay to obtain an opening in the overlay having a boundary defined by the pattern;
   (d) removing the overlay from engagement with the tool;
   (e) disengaging the tool from the projection structure; and
   (f) applying the overlay to the surface with the opening at least partially surrounding the projection structure.

2. The method as in claim 1, including frictionally engaging the projection structure within the receptacle.

3. The method as in claim 1, including adhesively securing the overlay to the surface.

4. The method as in claim 1, including, prior to step (b), adhesively applying a portion of the overlay to the surface.

5. The method as in claim 1 wherein the overlay is a plastic sheet.

* * * * *